United States Patent [19]
Gibier-Rambaud et al.

[11] 3,723,394
[45] Mar. 27, 1973

[54] PROCESS FOR THE PREPARATION OF POLYURETHANE PREPOLYMERS COMPRISING TERMINAL ISOCYANATE GROUPS

[76] Inventors: Alain Gibier-Rambaud, "Clos Zanardi" Chemin des Espeselle; Bernard Blanc, Ledfeyran Boulevard General Philiffe, both of Martigues, France

[22] Filed: May 28, 1971

[21] Appl. No.: 148,237

Related U.S. Application Data

[63] Continuation of Ser. No. 804,703, March 5, 1969, abandoned.

[52] U.S. Cl. .................260/77.5 AA, 260/77.5 AB
[51] Int. Cl. ................................................G08g 22/04
[58] Field of Search....260/77.5 AA, 75 NB, 77.5 AB

[56] References Cited

FOREIGN PATENTS OR APPLICATIONS 1,170,627  5/1964  Germany.............................260/77.5

OTHER PUBLICATIONS

Weissberger (ed) Technique of Organic Chemistry, Vol. III, Part I, Interscience, NY, 1956, pp. 811–817.
Blomeyer et al., Chem. Abstracts, Vol. 61, 1964, p. 4559d & e (Abstr. of Ger. 1, 170, 627).
Saunders et al, Polyurethanes, Part II, Interscience, NY, 1964, pp. 8, 9, 14, 15, 2024481.

*Primary Examiner*—Donald E. Czaja
*Assistant Examiner*—M. J. Welsh
*Attorney*—McDougall, Hersh, Scott & Ladd

[57]     ABSTRACT

Preparation of polyurethane prepolymers having terminal isocyanate groups comprising reacting an organic polyisocyanate with a polyhydroxylated compound having less than 0.1 percent by weight of water in the presence of a hydrolyzable metal halide at a temperature within the range of 50° to 100° C.

8 Claims, No Drawings

PROCESS FOR THE PREPARATION OF POLYURETHANE PREPOLYMERS COMPRISING TERMINAL ISOCYANATE GROUPS

This is a continuation of copending application Ser. No. 804,703, filed Mar. 5, 1969, now abandoned.

This invention relates to storage-stable polyurethane prepolymers having terminal isocyanate groups in which the prepolymers are intended for use in the production of cross-linked polyurethanes for use in paints, varnishes, coatings, adhesives and elastomers.

Polyurethane prepolymers of the type described have been prepared by the reaction of polyhydroxylated compounds with organic polyisocyanates in excess of the stoichiometric amount. The prepolymers prepared in accordance with the described method suffer from the disadvantage in that they continue to develop during storage. This development, which is manifested by a reduction in the number of free isocyanate groups and by an increase in the viscosity of the material, is due to undesirable secondary reactions such as reactions forming functional urea or allophanate groups.

Such progressive reduction in the number of isocyanate groups is disadvantageous in that it reduces the possibilities of cross-linking in subsequent reaction with compounds having hydrogen atoms which are active with respect to the isocyanates. The increase in viscosity, which accompanies the reduction in the number of free isocyanate groups, sometimes makes it difficult to use these prepolymers. Finally, such development makes it necessary precisely to measure the amount of free isocyanate in the prepolymer before use in the preparation of high quality polyurethanes by addition of the correct amount of cross-linking agent.

It is known that certain hydrolyzable salts, such for example as antimony or tin chlorides, may be added to the polyurethane prepolymers having terminal isocyanate groups in amounts within the range of 0.08 to 5 percent with respect to the total weight of the prepolymer. The addition of these chlorides yields the advantage of catalyzing the cross-linking reaction of these prepolymers by means of compounds having active hydrogen atoms, but it does not provide effective stabilization.

It is also known that, in order to prevent the formation of bubbles in the polyurethane masses, the water contained in the polyhydroxylated compound to which various fillers may be added, should be eliminated as by means of fairly large amounts, generally between 2.5 to 5 percent by weight of aluminum or magnesium halides, before reaction with the polyisocyanate.

This process is subject to a number of disadvantages. On the one hand, acid formed in corresponding amounts causes corrosion of the equipment. On the other hand, metal hydroxides, which are also formed, give rise to turbidity which, from a practical standpoint, prohibits utilization in certain applications, such as varnishes. Finally, catalysis of the polyurethane formation reaction, which is currently effected by means of amino compounds such as triethylenediamine or N-methylmorpholine, is greatly disturbed by the possible excess of halides which are introduced.

It has been found and it is an object of this invention to prepare polyurethane prepolymers which are very stable upon storage and which have a very small number of undesirable functional groups of the type urea or allophanate.

In accordance with the practice of this invention, the desired results have been obtained by using in the preparation, a polyhydroxylated compound which has previously been dehydrated and to which very small amounts of hydrolyzable metal halides are added.

Additionally, the polyurethane prepolymers produced in accordance with this invention have the advantage of being readily pigmented, which makes them easy to use, it being possible simply to follow homogenization of mixtures thereof with the cross-linking agent that is used.

Thus, the present invention relates to a process for the preparation of a polyurethane prepolymer having terminal isocyanate groups by reaction, at a temperature within the range of 50° to 100° C, of an organic polyisocyanate and a polyhydrolated compound containing less than 0.1 percent by weight of water, with the addition of an amount of hydrolyzable metal halide within the range of 100 to 5,000 parts per million by weight.

The invention also concerns, as a new industrial product, the polyurethane prepolymers produced by the described process and the cross-linked polyurethanes produced from said prepolymers and compounds having at least two hydrogen atoms which are reactive with respect to the isocyanates.

As the polyhydroxylated compound, it is possible to make use of a wide variety of such compounds. In particular, use can be made of polyols such as alkylenegylcols, glycerol, trimethylolpropane, pentaerythritol, sorbitol or polyether-polyols produced by the reaction of ethylene oxide and/or propylene oxide and said polyols.

The polyhydroxylated compounds are first dehydrated to a water content of less than 1,000 parts per million by weight and preferably less than 500 parts per million. Dehydration can be effected, for example, by simply heating under vacuum.

A wide variety of hydrolyzable metal halides can be used. Excellent results can be obtained by using aluminum trichloride or titanium tetrachloride, but it is also possible to make use of tin tetrachloride, antimony trichloride or pentachloride. The amount of hydrolyzable metal halide that is used depends upon the amount of residual water contained in the polyhydroxylated compound. In order to obtain good results, it has been found that the ratio by weight between the amount of chloride used and the amount of water contained in the polyhydroxylated compound should be higher than 0.8 when use is made of titanium tetrachloride or higher than 2.0 when use is made of aluminum trichloride.

The polyhydroxylated compound and the chloride can be easily premised by simple agitation. When use is made of aluminum trichloride, it should be crushed first to a sufficiently fine powder.

A wide variety of organic polyisocyanates can be used to prepare the prepolymers in accordance with the practice of this invention.

For this purpose, it is preferred to make use of aliphatic polyisocyanates, such as hexamethylene diisocyanate or aromatic polyisocyanates such as toluene diisocyanate and diphenylmethane diisocyanate.

The prepolymers can be prepared in the conventional manner by mixing the organic polyisocyanate and the polyhydroxylated compound with the addition of a suitable amount of metal halide. The reaction can be carried out by maintaining the mixture, preferably with agitation, at a temperature within the range of 50° to 100° C for a period which can range from one to several hours.

The resulting prepolymers are highly stable. They can be preserved, especially when air-proofed, for several months and even for several years without deterioration in their properties.

The prepolymers can be cross-linked by means of various compounds having hydrogen atoms which are active with respect to the isocyanates, such, for example, as in the presence of high humidity, water, a polyol, a polyether-polyol or a polyamine. It is thus possible to produce polyurethanes and/or polyurea polyurethanes in the form of paints, varnishes, coating materials, adhesives and elastomers having remarkable mechanical properties and a high degree of resistance to chemical agents.

The following examples are given by way of illustration, but not by way of limitation.

Example 1

A polyether-triol having a molecular weight of about 3,000, such as produced by the reaction of propylene oxide and glycerol, is dehydrated by heating to a temperature of about 120° C at a pressure of less than 20 mm of mercury for one hour.

The polyether-polyol is then cooled and its water content, measured by the Fischer method, is 270 parts per million by weight (ppm).

First an amount of titanium tetrachloride corresponding to 350 ppm and then, one minute later, twice the stoichiometric amount of toluene-diisocyanate is introduced rapidly and with agitation into this polyether-polyol. The mixture is heated and maintained at a temperature of 70° C for 3 hours.

The resulting prepolymer has an isocyanate content equal to 3.55 percent by weight and a viscosity of 160 poises. Its properties remain unchanged after air-proof storage for a period of 5 months.

In a second comparative test, a prepolymer is prepared of the same compounds in the same proportions, but without titanium tetrachloride. With the reaction medium being maintained at 70° for 7 hours, a product which titrates 4 percent by weight of free isocyanate groups is obtained.

The development of the free NCO content, as a function of time, is indicated in Table I.

TABLE I

| Time | 1 day | 2 days | 5 days | 12 days | 26 days |
|---|---|---|---|---|---|
| Free NCO content | 3.85% | 3.65% | 3.55% | 3.35% | 3.30% |

In a third test, a prepolymer is prepared as in the second test, comprising 4 percent of free NCO groups, to which addition of 350 parts per million of titanium tetrachloride is made. This addition of titanium tetrachloride does not provide stabilization of the prepolymer, the development of which, as a function of time, is indicated in Table II.

TABLE II

| Time | 1 day | 2 days | 5 days | 12 days |
|---|---|---|---|---|
| Free NCO content | 3.40% | 3.35% | 3.30% | 3.25% |

Example 2

A polypropylene glycol, having a molecular weight of approximately 2,000 is dried for 2 hours under a vacuum of less than 20 mm of mercury at a temperature of about 80° C. It is then cooled to 30° C and analyzed to contain 110 ppm water, using the Fischer method.

250 ppm of aluminum trichloride in molar solution in volatile oil are then introduced rapidly, with vigorous agitation into the polypropylene glycol followed after an interval of one minute, by the addition of twice the stoichiometric amount of toluene diisocyanate. The mixture maintains itself without further heating at a temperature of 60° to 70° C for about 2 hours.

The prepolymer obtained has an isocyanate content of 3.5 percent which is subsequently retained.

Example 3

Trimethylolpropane is subjected to azeotropic drying with toluene as the solvent. After removing all of the solvent, it will be found that the trimethylolpropane has a water content of 150 ppm by weight, using the Fischer method.

Two parts by weight of ethyl acetate for one part by weight of trimethylolpropane are mixed and 300 ppm by weight, calculated on the amount of trimethylolpropane, of titanium tetrachloride are added to this mixture in the form of a molar solution in a volatile oil.

The resulting solution is progressively introduced into twice the stoichiometric amount of toluene diisocyanate maintained at 70° C. As soon as the addition of the triol is concluded, the prepolymer obtained has an isocyanate content of 14.8 percent which is subsequently maintained.

Example 4

Example 1 is repeated, but instead of making use of glycerol use is made of an equivalent amount of other alkylene-gylcols such as pentaerythritol, sorbitol and polyether-polyols.

Example 5

Example 1 is repeated, but instead of making use of titanium tetrachloride use is made of aluminum trichloride, tin tetrachloride, antimony trichloride or antimony pentachloride in equivalent amounts.

Example 6

Example 1 is repeated, but instead of making use of toluene diisocyanate use is made of an equivalent amount of hexamethylene diisocyanate or diphenylmethane diisocyanate.

It will be understood that changes may be made in the details of formulation and operation, without departing from the spirit of the invention, especially as defined in the following claims.

We claim:

1. A process for the preparation of polyurethane prepolymers having terminal isocyanate groups comprising combining a polyhydroxylated compound containing less than 0.1 percent by weight water with titanium halides in an amount within the range of 100 to 5000 ppm by weight and reacting the resulting mixture with an organic polyisocyanate.

2. The process as claimed in claim 1 in which the reaction is carried out at an elevated temperature with the range of 50°–100°C.

3. The process as claimed in claim 1 in which the titanium halide is titanium tetra-chloride.

4. The process as claimed in claim 1 in which the polyhydroxylated compound is a polyol of a polyether-polyol obtained by the reaction of a polyol with an alkylene oxide selected from the group consisting of ethylene oxide, propylene oxide and mixtures thereof.

5. The process as claimed in claim 4 in which the polyol is selected from the group consisting of alkyleneglycols, glycerol, trimethylolpropane, pentaerythritol and sorbitol.

6. As new industrial products, the polyurethane prepolymers produced by the process according to claim 1.

7. Cross-linked polyurethanes produced by the reaction of the prepolymers of claim 6 with compounds having, per molecule, at least two hydrogen atoms which are active with respect to the isocyanates.

8. The processes claimed in claim 3 in which the ratio by weight between the amount of titanium halide to the amount of water contained in the polyhydroxylated compound is more than 0.8.

* * * * *

UNITED STATES PATENT OFFICE
CERTIFICATE OF CORRECTION

Patent No. 3,723,394      Dated March 27, 1973

SN 148,237

Inventor(s) Alain Gibier-Rambaud and Bernard Blanc

It is certified that error appears in the above-identified patent and that said Letters Patent are hereby corrected as shown below:

Cover page, line 6, delete "Espeselle" and insert therefor -- Esperelle --

Cover page, line 7, delete "Ledfeyran" and insert therefor -- Le Meyran, --

Cover page, line 8, delete "General Philiffe" and insert therefor -- Gérard Philippe --

Signed and sealed this 19th day of November 1974.

(SEAL)
Attest:

McCOY M. GIBSON JR.
Attesting Officer

C. MARSHALL DANN
Commissioner of Patents